(Model.)
L. L. FRIERSON.
NUT LOCK.
No. 431,966.
Patented July 8, 1890.
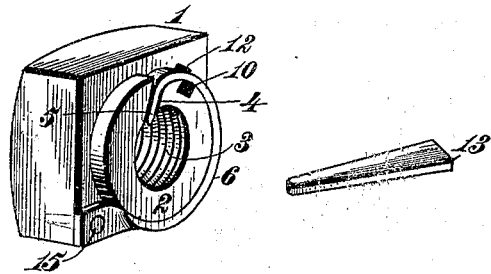
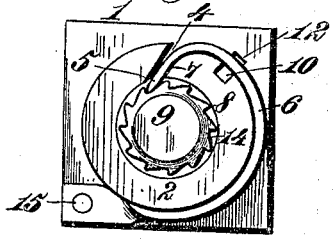 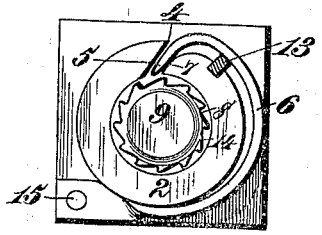
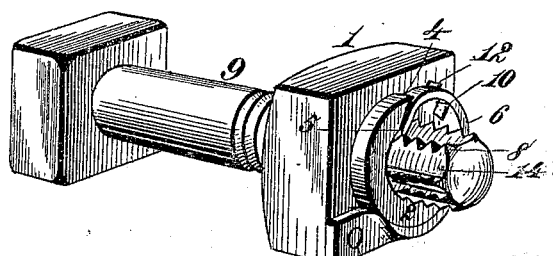
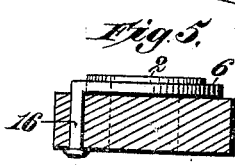
Witnesses,
Robert Ewatt.
J. A. Rutherford.
Inventor.
Luther L. Frierson.
By James L. Norris.
Atty.

UNITED STATES PATENT OFFICE.

LUTHER L. FRIERSON, OF MOUNT PLEASANT, TENNESSEE.

NUT-LOCK.

SPECIFICATION forming part of Letters Patent No. 431,966, dated July 8, 1890.

Application filed February 14, 1889. Serial No. 299,859. (Model.)

*To all whom it may concern:*

Be it known that I, LUTHER L. FRIERSON, a citizen of the United States, residing at Mount Pleasant, in the county of Maury and State of Tennessee, have invented new and useful Improvements in Nut-Locks, of which the following is a specification.

The object of this invention is to provide a simple and effective means for securing nuts upon screw-bolts and preventing them from unscrewing or shaking off under the sudden jar and strain to which nut-locks are often exposed.

My invention comprises a nut having an annular boss upon its outer side, said boss being formed with a diagonal transverse slot, a spring having one end permanently secured to the outer side of the nut and its other end passed through said slot and adapted to engage a screw-bolt to prevent the nut from slipping when secured in place, and a key for disengaging the spring from said bolt in order to loosen the nut and permit its removal.

The invention consists in certain peculiarities of construction, as hereinafter set forth, whereby I am enabled to furnish a safe, durable, and convenient nut-lock that can be readily operated and is not liable to get out of order or become displaced or disconnected while in use.

In the annexed drawings, illustrating my invention, Figure 1 is a perspective view of the nut with its annular boss and permanently-attached spring and the key for retracting the spring. Fig. 2 is a plan or face view of the nut, showing the spring engaged with the bolt. Fig. 3 is a similar view showing the key in operative position to retract the spring and allow the nut to be disengaged from the bolt. Fig. 4 is a perspective view of the nut and bolt engaged. Fig. 5 is a sectional detail view of the nut and spring, illustrating a modification in the permanent attachment of the spring to the nut.

Referring to the drawings, the numeral 1 designates a nut, which may be of any suitable or well-known form. On the outer side of this nut is an annular boss 2, the interior of which is continuous with the threaded bolt-orifice 3, which is surrounded by said boss. This annular boss 2 is intersected on one side by a diagonal slot 4, that receives the beveled end 5 of a curved or nearly circular spring 6, which partly surrounds said boss and is permanently riveted or otherwise secured at its other end to the body of the nut.

It will be observed that the spring 6 is adapted to closely embrace the curved periphery of the boss 2, and also that the beveled free end of said spring is turned inward through the slot 4 on such a curve as to have a jam fit with the correspondingly-curved bearing 7 on the inner side of the diagonal slot. When sprung inward in close contact with the periphery of the annular boss 2, the beveled end of the spring 6 will engage a suitable ratchet-surface 8 on the screw-bolt 9 and so prevent the nut from working or jarring loose. In the periphery of the boss 2, near the slot 4 and beneath the spring 6, is a wedge-shaped notch 10, which is continuous with a corresponding opening 12, formed in or through the nut. By forcing a key or wedge 13 into the notch 10 the spring 6 will be retracted or disengaged from the bolt-ratchet and so enable the nut to be removed from the bolt without difficulty or loss of time.

The ratchet-surface 8 on the end of the bolt 9 is preferably formed by cutting a series of parallel longitudinal grooves 14, so as to intersect the screw-threads. These grooves 14 need extend longitudinally only a short distance from the end of the bolt sufficient to afford a proper range of movement for setting the nut. They should not be cut deeper than the screw-threads of the bolt, and for this reason it is apparent that the ratchet-grooves 14 can be placed so closely together as to afford a very great nicety of adjustment for the nut without liability of its working loose. It is obvious that a ratchet-surface formed as above described will not weaken the bolt or in any way impair the durability of the fastening.

By giving a proper curvature to the bearing-surface 7 and adjacent free end of the spring 6, as shown in Figs. 2 and 3, there will always be a jam fit between the curved end of the spring and the curved bearing 7 when the spring and ratchet are engaged, thus obviating any possibility of slipping and effectually preventing the nut from being jarred or shaken off.

The spring 6 is preferably provided at its attached end with an eye for passage of a pin or stud 15, which is struck or headed up, so that the spring will be permanently secured to the body of the nut. This construction is shown in Figs. 1, 2, 3, and 4. Instead of forming an eye in the attaching end of the spring 6, I may provide that end of the said spring with an arm or stud 16, projecting at a right angle and secured by heading or riveting it in an opening formed in the body of the nut, as shown in Fig. 5, or its spring may be permanently secured to the nut in any suitable manner. This spring 6, being permanently secured to the nut, cannot become displaced or disconnected, as is liable to occur with some spring-fastenings, and the construction and arrangement of all the parts are so simple and durable that the nut-lock is not likely to get out of order and can be effectively employed for a long time.

The operation of this nut-lock will readily appear from the foregoing description in connection with the drawings, and it will be seen that, while a key is necessary to disengage the lock, the nut can be turned upon the bolt continuously without requiring the use of any implement other than an ordinary wrench. It will also be seen that the wedge-shaped form of the key 13 and the corresponding notch 10 and opening 12 for its reception are such that when the key is used to disengage the fastening there is no liability of strain or injury to the spring.

I am aware that heretofore one side of a nut has been cut away, so as to form thereon a polygonal boss or shoulder that is provided with opposite radial slots, in one of which is inserted the attaching end of a bent spring that embraces and fits the said polygonal boss and which carries at its free end a forked locking-pin that is beveled on one side to engage ratchet-grooves that are cut into the screw-bolt. This construction, however, I do not claim, and my invention differs essentially from any nut-lock of which I am aware in that it comprises a nut having on its outer side a circular or annular boss that is provided with a single diagonal slot having a curved bearing on its inner side, a curved spring being permanently secured at one end to said nut and arranged to closely embrace the circular periphery of the boss in such a way that its free end will project through the diagonal slot and engage longitudinal ratchet-grooves formed in the screw-bolt, which ratchet-grooves are of no greater depth than the screw-threads of the bolt, and consequently can be placed so close together as to afford a great range of adjustment without weakening the bolt, which would be seriously injured by the deep ratchet-grooves ordinarily required. By my invention, also, the curved bearing on the inner side of the diagonal slot permits a jam fit between it and the inner side of the free end of the curved spring, whereby the tendency of the spring to press outwardly is effectually prevented and its free end is held in close engagement with the ratchets of the screw-bolt.

Having thus described my invention, what I claim is—

1. In a nut-lock, a nut having on its outer side an annular boss surrounding the bolt-orifice and a permanently-attached curved spring that closely embraces said boss, which boss is provided with a diagonal slot for admitting the curved free end of said spring, and a curved bearing on the inner side of said slot for obtaining a jam fit with the curved inner side of the spring end, substantially as described.

2. In a nut-lock, a nut provided on its outer side with an annular boss surrounding the bolt-orifice and a permanently-attached curved spring closely embracing the boss and having an eye at its attaching end for the passage of its fastening pin or stud, said annular boss being provided with a diagonal slot for admitting the curved free end of the spring and having a curved bearing on the inner side of said slot for obtaining a jam fit with the curved inner side of the spring end, substantially as described.

3. In a nut-lock, the combination, with a ratcheted screw-bolt, of a nut having on its outer side an annular boss provided with a diagonal slot and having a curved bearing on the inner side of said slot, and a curved spring permanently secured to the nut and having its free end inserted in said slot to engage the ratcheted screw-bolt, said nut being provided with a key-notch to permit the insertion of a key to disengage the spring from the bolt-ratchets, substantially as described.

In testimony whereof I have affixed my signature in presence of two witnesses.

LUTHER L. FRIERSON.

Witnesses:
JAMES L. NORRIS,
VINTON COOMBS.